March 28, 1961 R. P. FORSBERG ET AL 2,977,265
CERAMIC STRUCTURE AND METHOD OF MAKING SAME
Filed June 19, 1957 2 Sheets-Sheet 1

INVENTORS
KENNETH M. HOLLAND
RICHARD P. FORSBERG
BY
Townsend and Townsend
ATTORNEYS March 28, 1961  R. P. FORSBERG ET AL  2,977,265
CERAMIC STRUCTURE AND METHOD OF MAKING SAME
Filed June 19, 1957  2 Sheets-Sheet 2

INVENTORS
KENNETH M. HOLLAND
RICHARD P. FORSBERG
BY
Townsend and Townsend
ATTORNEYS

United States Patent Office 2,977,265
Patented Mar. 28, 1961

2,977,265

CERAMIC STRUCTURE AND METHOD OF MAKING SAME

Richard P. Forsberg, Berkeley, and Kenneth M. Holland, El Cerrito, Calif., assignors to Hexcel Products Inc., Berkeley, Calif., a corporation of California Filed June 19, 1957, Ser. No. 666,601

5 Claims. (Cl. 154—43)

The present invention relates to a new structural sandwich construction and, more particularly, to a ceramic honeycomb product and a method of making same.

Heretofore it has been proposed to manufacture honeycomb sandwich structures having relatively high strength weight ratios from a variety of corestocks and facing materials. More conventional honeycomb corestock has been made from various metal foils such as aluminum, stainless steel, and titanium alloy as well as from resin impregnated glass and textile fabrics and paper. These corestocks have been faced with the same or equivalent materials from which the corestocks are made or from various combinations of such materials. Sandwich structures of the type above referred to have been utilized in the construction of aircraft and guided missiles and in other fields.

It is well known and appreciated that the designers of ultrasonic speed aircraft and missiles are limited in their selection of structural compositions to materials that are capable of withstanding the relatively high temperatures generated by air friction, and the higher the design air speeds the greater the necessity for employing materials with the ability to maintain their strength and other physical and chemical properties at elevated temperatures. It is well known that ceramic compositions in general inherently have relatively high heat resistant characteristics exceeding those of substantially all organic materials as well as many metals particularly, of course, the lower temperature melting alloys of aluminum and magnesium.

A further object of the invention is to teach a method of making structural ceramic corestock which generally embraces the concept of initially providing a reinforcing web or carrier of preferably permeable sheet material such as woven or unwoven glass or textile fabric, perforated metal, or screening. The carrier is fabricated to define a geometrically configured open cellular section which may be coated by dipping or otherwise with a wet ceramic composition or slurry to embed the reinforcing carrier within a uniform wall thickness of ceramic. The preferred method further entails the concept of causing the wet ceramic material to penetrate through the permeations in the carrier to cause intimate cohesion between the ceramic on opposite sides of the carrier material. Thereupon and while maintaining the geometrically configured pattern of the carrier web embedded within the ceramic wall coating the structure is fired to bake the ceramic to a hard set condition and by which the configuration is maintained and permanently fixed.

A further object of the invention is to teach a method manufacturing a unitary or integral ceramic sandwich structure which embraces the concept of applying ceramic facings to the ceramic corestock. Preferably in this invention it is proposed to apply wet ceramic facings to opposite sides of the wet ceramic corestock to cause intimate flow and cohesion between the corestock facings. Thereupon the entire sandwich structure may be subjected to firing heat to cause the ceramic of both the corestock and facings to bake to hard set condition.

A more specific object is to teach how a ceramic honeycomb corestock may be initially fabricated employing a heat destructive reinforcing web or carrier which during the firing or baking cycle of the ceramic will burn out or decompose leaving, in effect, a ceramic structural corestock composed substantially exclusively of unreinforced baked ceramic composition.

Other numerous objects and advantages of the present invention will become apparent upon reading the following specifications and referring to the accompanying drawings in which similar characters of reference represent corresponding parts in each of the several views.

Fig. 1 is a fragmentary perspective view of a reinforcing web or carrier fabricated to define a honeycomb section of open geometric cell configuration.

Fig. 2 discloses the reinforcing web embedded within wall thicknesses of ceramic composition.

Fig. 3 is an enlarged fragmentary sectional view in perspective taken on line 3—3 of Fig. 2.

Fig. 4 discloses the wet ceramic corestock applied to one ceramic facing.

Figure 1:
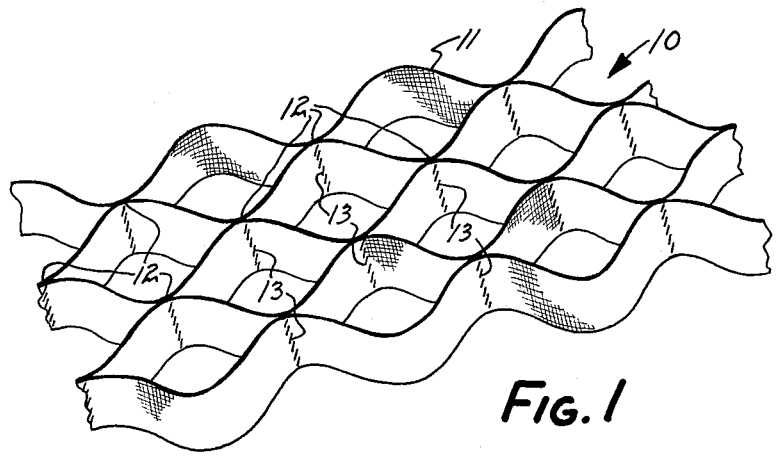

Referring now more specifically to the drawings Fig. 1 is illustrative of the first step of the method which resides in providing a reinforcing web 10 to function as a carrier or form for the ceramic material in its wet or slurry condition. The reinforcing carrier may be formed of any one of numerous types of preferably permeable sheet materials such as textile, glass fibre, or metal fibre, woven or unwoven fabrics, perforated metal foil or plastic films, or various types of metal wire or fabric screen material. The sheet material selected is fabricated into a cellular honeycomb shape or pattern of uniform or geometric cell configuration. For purposes of illustration and example Fig. 1 discloses the reinforcing web or carrier as comprising a plurality of ribbons or webs 11 of coarse woven cotton or similar textile fabric. The ribbons are sinusoidally curved and extend in a common direction with the adjacent nodes 12 of the ribbons mechanically fastened together as by sewing or stitching 13. It is appreciated however that various ways other than by sewing can be utilized to join the ribbons 11 node to node. In this connection metal fasteners, staples, or other mechanical fastening or interlocking means may be employed in lieu of stitching, or, the node connections may be accomplished by chemical adhesives. In the case of metal wire screening or perforate sheet metal foil ribbons the node to node connections may be accomplished by resistance welding, soldering, brazing or by other suitable and known joining means within the skill of the art.

It is also appreciated that the reinforcing web or carrier may be fabricated to define any desired geometric cell configuration of requisite cell size to meet the particular structural specifications.

The second step in the present method entails enveloping, coating or embedding the carrier 10 within a wet ceramic composition 14. In this connection the carrier 10 may be dipped or immersed in a wet ceramic slurry to coat all areas of the web material with the desired wall thickness of ceramic. The same results may also be accomplished by wetting the carrier 10 and then dusting the wet carrier material with the dry powdered ceramic frit to cause the carrier material to be enveloped by and embedded within the wall thicknesses or layers of the ceramic 14.

It will be readily understood that if the reinforcing carrier 10 is made from relatively stiff or rigid sheet material such as metal foil or metal screening or the like the inherent stiffness of the carrier material will itself be sufficient to maintain in fixed condition the desired geometric cell configuration of the carrier section during the ceramic dipping or dusting operations. In the event the carrier 10 is made of a relatively soft and pliant material such as cloth or fabric then either the latter must be mechanically jigged to maintain its shape during application of the wet ceramic thereto or the material must be impregnated with a suitable stiffening agent that will provide requisite rigidity for the carrier section to sustain its desired shape. In the event the carrier is made of a cotton or like fabric ordinary laundry starch might be employed as a stiffening agent.

Figure 3:
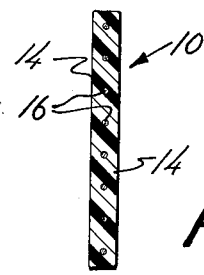

As previously mentioned the sheet material from which the reinforcing carrier 10 is made preferably should be permeable so that when the wet ceramic slurry is applied the ceramic coatings on both sides of the material will migrate or penetrate through the permeations so that the ceramic on opposite sides of the material will intimately cohere to establish a homogeneous reinforced ceramic body. As indicated in Fig. 3 the interstices of a woven fabric such as indicated at 16 permits migration or flow of the wet ceramic through the reinforcing carrier.

It is not intended that the scope of the present invention be limited to any specific types or classes of ceramic composition it being evident that the selection and use of a given ceramic will depend on the property characteristics ultimately required; and it is therefore considered that the choice of a particular ceramic in any given application is within the scope of the ceramic art. However for purposes of illustration the following ceramic compositions and method of treatment is given in Table I and II hereinbelow:

*Table I.—Mill batch and milling data for wet slurry or coating* [1]

| Material: | Parts by weight |
|---|---|
| Frit | 100 |
| Enameling clay | 6 |
| Borax | 1 |
| Water | 42.5 |

[1] Milling fineness, 6 to 8% retained on a No. 200 U.S. Standard sieve, application thickness (dry), 7 or 8 mils.

*Table II.—Basic composition of frit used in Table I*

| Batch composition | | Computed chemical composition | |
|---|---|---|---|
| Material | Parts by weight | Component | Percent by weight |
| Potash feldspar | 30.82 | $SiO_2$ | 51.0 |
| Borax (hydrated) | 44.25 | $B_2O_3$ | 16.1 |
| Flint | 30.50 | $Al_2O_3$ | 5.7 |
| Soda Ash | 9.16 | $Na_2O$ | 15.4 |
| Soda Niter | 5.15 | $K_2O$ | 3.5 |
| Fluorspar | 8.30 | $CaF_2$ | 8.3 |
| | 128.18 | | 100.0 |

It is suggested that the foregoing exemplary ceramic composition after its application to the reinforcing web 10 as by dipping or immersing the web within the slurry should be fired in a kiln or furnace at temperatures varying from 1450° F. to 1750° F. and preferably at 1550° F. for about 5 minutes more or less to obtain satisfactory results.

It is contemplated that in certain structural or other applications it may be desirable to manufacture only the ceramic honeycomb corestock for application of facings to opposite sides of the core at a subsequent time. It is further contemplated that various types of facings might be applied to a ceramic corestock depending on the use to which the ultimate sandwich structure is to be put. Thus facings made of metal, sheet glass or other materials including ceramic tile might be applied to the ceramic core by ceramic adhesive materials or by other types of bonding agents.

Where it is desired to fabricate only the ceramic corestock (without facings) the above described steps would be followed and after the wet ceramic had been applied to the reinforcing carrier 10 the unit would be fired to bake the ceramic composition at proper temperature and desired time interval.

As earlier noted by selecting a permeable material from which to make the carrier web 10 and which has a heat destructive temperature substantially below the firing temperature of the ceramic, the carrier may be substantially and completely burned out or decomposed in the firing cycle. This may be desirable in any application where it is desired to obtain a honeycomb core composed substantially, solely of the ceramic without presence of a foreign substance in the nature of a reinforcing carrier. It is realized of course that any known web carrier substance employed will, upon decomposing or burning out under influence of heat, leave a carbon or ash deposit and will create voids within the ceramic in areas previously occupied or displaced by the presence of the reinforcing web. The effect of such voids and ash deposits left by burning out the reinforcing material during the firing cycle need not necessarily be deleterious to the strength properties of the ceramic body; and such factors are considered to be dependent upon known or calculable information concerning the type and character of materials employed and the conditions to which they are subjected during fabrication and firing of the ceramic unit as well.

In other applications it may be deemed desirable to employ a permanent reinforcing carrier which would be selected from a class of materials able to withstand the firing temperatures of the ceramic without destruction, decomposition, or undue distortion. In this connection relatively high melting point metals such as stainless steel or titanium are exemplary. There also appears to exist certain types of glass, asbestos and ceramic fibres having sufficiently high melting or decomposition points to withstand the firing heat of many types of ceramic compositions.

In the event it is desired to fabricate a substantially homogeneous or composite ceramic sandwich structure in which ceramic facings are intimately cohered to a ceramic corestock the following manufacturing steps are proposed.

Figure 2:
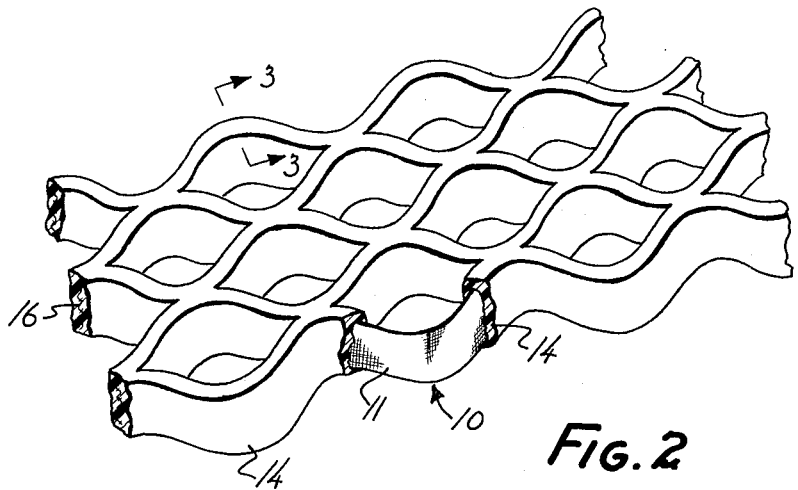
Figure 4:
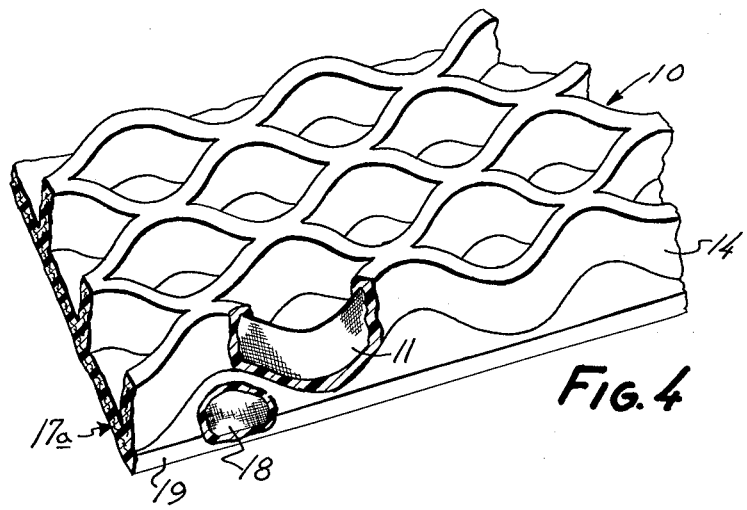

After application of the wet ceramic slurry to the reinforcing carrier 10 as described with reference to Fig. 2, and before firing or baking of the latter, it is proposed to provide wet reinforced ceramic facings such as indicated at 17a and 17b in Figs. 4 and 5. Fig. 4 discloses how a flat section of preferably permeable reinforcing sheet material 18 coated on both sides and embedded within a wet ceramic slurry 19 can be superposed to one of the sides or faces of the wet corestock and whereby ceramic 19 of the facing will intimately flow into contact and cohere with the wet frit or slurry 14 of the corestock 10. With two such facings 17a and 17b applied, the entire sandwich structure may be fired in an oven or kiln. Alternatively it is possible to bake or partially bake the corestock with only one of the facings applied, and thereafter the second facing is applied and the entire unit fired until all the ceramic is properly baked.

The reinforcing material 18 utilized to support the wet ceramic of the facings may, of course, be made from the identical material from which the carrier 10 is made or the element 18 may be selected from an entirely different class of materials than carrier 10 depending entirely on the job requirements.

Figure 5:
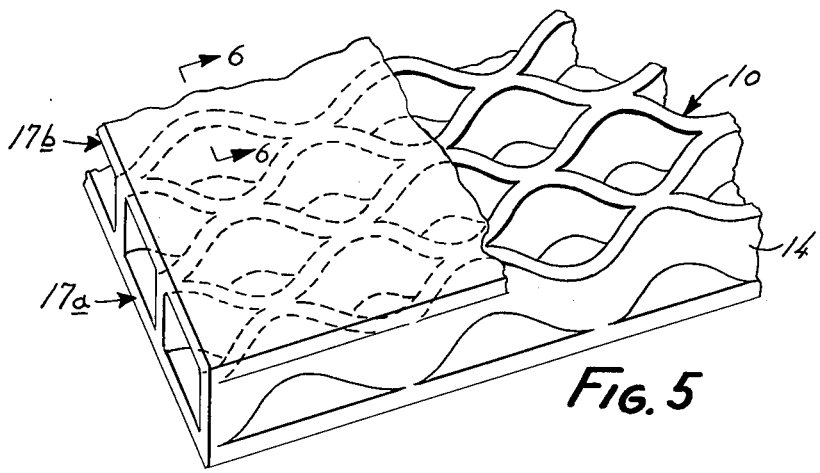
Fig. 5 is a perspective view of a completely fabricated ceramic honeycomb sandwich structure with portions broken away.
Figure 6:
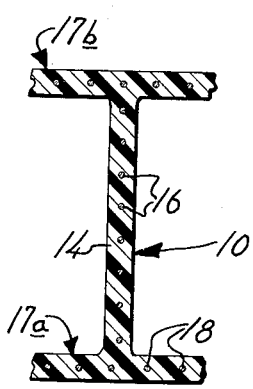
Fig. 6 is an enlarged, fragmentary sectional view taken substantially in the plane of line 6—6 of Fig. 5.

Fig. 5 discloses fragmentarily a completely fabricated composite ceramic sandwich structure in which the edges and flat surfaces of the facings are shown as having been ground or machined to provide smooth surface within desired dimension tolerances.

As heretofore indicated, the selection and use of any particular type of ceramic is not considered a limiting factor on the scope of the present invention. Further, the present invention contemplates the use of materials such as recently reported pyroceram which appears to have property characteristics of a ceramic if, indeed, it is not a ceramic. (Specific reference is made to the article "The Fabulous Glass Child," John Lear, published in Saturday Review, June 1, 1957, edition.)

Although the present invention has been described in some detail by way of illustration and example for purposes of clarity of understanding, it is understood that certain changes and modifications may be made within the spirit of the invention and is limited only by the scope of the claims appended hereto.

We claim:

1. A structural sandwich corestock comprising reinforcing web fabricated from sheet material into an integral geometric open cellular section; said sheet material formed throughout its area with closely spaced, relatively small, through-going openings; adjacent reinforcing webs connected together at spaced node areas defining double thickness web portions substantially entirely embedded within walls of baked ceramic composition with said composition penetrating from opposite sides of the web material through said openings homogeneously cohering the composition on opposite sides of the web material including the double thickness node bond areas; said ceramic composition defining generally the same geometric open cellular shape as said reinforcing web and defining a plurality of open ended cell openings extending unidirectionally through the thickness of said structure.

2. The combination of claim 1 and wherein said corestock is faced on opposite sides with facings of ceramic composition intimately cohered to the ceramic composition of said corestock providing an integral ceramic sandwich structure.

3. A method of making a ceramic structural corestock comprising the steps of: providing a reinforcing web fabricated from ribbons of permeable sheet material into a geometric open cellular section in which the cell openings extend unidirectionally through the thickness of the section and in which said ribbons are secured together at double ribbon thickness node areas; enveloping all areas of said reinforcing web with a wet ceramic coating of substantially uniform thickness to provide a uniformly coated ceramic cellular section having cell openings extending in the direction of the thickness of said section, and also causing said ceramic to penetrate through the web permeations to cause cohesion between the wet ceramic on opposite sides of the web material and to cause cohesion between and through adjacent ribbons at said node areas; while maintaining the geometric cellular configuration of said reinforcing web coated with said ceramic baking said ceramic to a hard set condition.

4. A method of making ceramic structural corestock comprising steps of: providing a reinforcing web fabricated from ribbons of permeable sheet material into a geometrically configured open cellular section in which the cell openings extend unidirectionally through the thickness of the said section and in which said ribbons are secured together at double ribbon thickness node areas; providing a quantity of wet ceramic slurry; while maintaining said reinforcing web in its geometric configuration dipping the same in said slurry to thoroughly and substantially uniformly coat and embed the said web material within said slurry and to cause said slurry to penetrate through the web permeations to provide intimate cohesion between the slurry on opposite sides of the web material and to cause cohesion between and through adjacent ribbons at said node areas; and while maintaining the slurry-dipped reinforcing web in geometric open cell configuration baking the ceramic to a hard set condition.

5. A method of making a ceramic structural corestock comprising the steps of: providing a quantity of ceramic frit; selecting a permeable sheet material capable of heat destruction at a temperature below the maximum baking temperature of the ceramic frit; forming said selected permeable sheet material into a reinforcing web section comprising ribbons defining geometrically configured cell openings extending unidirectionally through the thickness of said section and in which said ribbons are secured together at double ribbon thickness node areas, wetting said ceramic frit and enveloping all areas of said reinforcing web with said wet mixture to completely embed said web material within substantially uniform wall thicknesses of said mixture defining open geometric cellular configurations, and also causing said wet ceramic to penetrate through the web permeations to cause cohesion between the wet ceramic on opposite sides of the web material and to cause cohesion between and through adjacent ribbons at said node areas; while maintaining the open geometric cellular configuration of said reinforcing web embedded within said ceramic subjecting the same to baking temperature to cause said ceramic to bake to a hard set condition and to burn out the heat destructive reinforcing web.

References Cited in the file of this patent

UNITED STATES PATENTS

| | | |
|---|---|---|
| 2,218,675 | Fould | Oct. 22, 1940 |
| 2,369,006 | Banks | Feb. 6, 1945 |
| 2,554,327 | Gravely | May 22, 1951 |
| 2,644,777 | Havens | July 7, 1953 |
| 2,676,899 | Hackley | Apr. 27, 1954 |
| 2,763,586 | Noyes | Sept. 18, 1956 |
| 2,828,235 | Holland et al. | Mar. 25, 1958 |

FOREIGN PATENTS

| | | |
|---|---|---|
| 515,267 | Great Britain | Nov. 30, 1939 |
| 637,499 | Great Britain | May 17, 1950 |